United States Patent
Baek et al.

(10) Patent No.: US 12,255,330 B2
(45) Date of Patent: *Mar. 18, 2025

(54) POSITIVE ELECTRODE ACTIVE MATERIAL FOR SECONDARY BATTERY AND LITHIUM SECONDARY BATTERY INCLUDING THE SAME

(71) Applicant: LG Energy Solution, Ltd., Seoul (KR)

(72) Inventors: So Ra Baek, Daejeon (KR); Eun Sol Lho, Daejeon (KR); Wang Mo Jung, Daejeon (KR); Sang Wook Lee, Daejeon (KR); Eun Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,436

(22) Filed: Jan. 23, 2024

(65) Prior Publication Data

US 2024/0162437 A1   May 16, 2024

Related U.S. Application Data

(63) Continuation of application No. 17/263,383, filed as application No. PCT/KR2020/001526 on Jan. 31, 2020, now Pat. No. 11,916,233.

(30) Foreign Application Priority Data

Feb. 1, 2019   (KR) .................. 10-2019-0013809

(51) Int. Cl.
   *H01M 4/525*   (2010.01)
   *C01G 53/00*   (2006.01)
   (Continued)

(52) U.S. Cl.
   CPC .......... *H01M 4/525* (2013.01); *C01G 53/50* (2013.01); *H01M 4/505* (2013.01);
   (Continued)

(58) Field of Classification Search
   CPC ..................................... C01G 53/42
   See application file for complete search history.

(56) References Cited

U.S. PATENT DOCUMENTS

| 11,916,233 B2 * | 2/2024 | Baek ............. C01G 53/50 |
| 2011/0315917 A1 | 12/2011 | Chang et al. |

(Continued)

FOREIGN PATENT DOCUMENTS

| CN | 102804458 A | 11/2012 |
| CN | 103915610 A | 7/2014 |

(Continued)

OTHER PUBLICATIONS

Peihong, F. et al., "Application of X-ray diffractometer in characterization of ternary cathode materials for lithium-ion batteries" Focus, Sep. 2016, pp. 1-8.

(Continued)

*Primary Examiner* — Peter F Godenschwager
(74) *Attorney, Agent, or Firm* — Lerner David LLP

(57) ABSTRACT

A positive electrode active material for a secondary battery which includes a nickel-based lithium composite transition metal oxide including nickel (Ni), wherein the lithium composite transition metal oxide satisfies Equation 1 and Equation 2 below $$80 \text{ nm} \leq \text{crystallite size}_{FWHM} \leq 150 \text{ nm} \quad [\text{Equation 1}]$$

$$\Delta \text{ size}(|\text{crystallite size}_{IB} - \text{crystallite size}_{FWHM}|) \leq 20 \quad [\text{Equation 2}]$$

wherein, in Equation 1 and Equation 2, crystallite size$_{FWHM}$ is a crystallite size obtained by calculating from X-ray diffraction (XRD) data using a full width at half maximum (FWHM) method, and crystallite size$_{IB}$ is a crystallite size obtained by calculating from XRD data using an integral breadth (IB) method.

8 Claims, 1 Drawing Sheet

(51) Int. Cl.
　　*C01G 53/50*　　　　(2025.01)
　　*H01M 4/02*　　　　(2006.01)
　　*H01M 4/505*　　　(2010.01)
　　*H01M 10/0525*　　(2010.01)

(52) U.S. Cl.
　　CPC ..... *H01M 10/0525* (2013.01); *C01P 2002/70* (2013.01); *C01P 2004/51* (2013.01); *H01M 2004/021* (2013.01); *H01M 2004/028* (2013.01)

(56) References Cited

U.S. PATENT DOCUMENTS

| | | |
|---|---|---|
| 2013/0234064 A1 | 9/2013 | Chang et al. |
| 2014/0193714 A1 | 7/2014 | Kim et al. |
| 2014/0299813 A1 | 10/2014 | Chang et al. |
| 2016/0254536 A1 | 9/2016 | Hiratsuka |
| 2016/0372749 A1 | 12/2016 | Iida et al. |
| 2017/0062818 A1 | 3/2017 | Ogata et al. |
| 2018/0019474 A1 | 1/2018 | Lee et al. |
| 2018/0026266 A1 | 1/2018 | Choi et al. |
| 2018/0048015 A1 | 2/2018 | Lee et al. |
| 2019/0044136 A1 | 2/2019 | Sakai |
| 2019/0190018 A1 | 6/2019 | Aoki et al. |
| 2019/0341598 A1 | 11/2019 | Nam et al. |
| 2019/0386304 A1 | 12/2019 | Kojima et al. |

FOREIGN PATENT DOCUMENTS

| | | |
|---|---|---|
| CN | 105981210 A | 9/2016 |
| CN | 107251282 A | 10/2017 |
| CN | 107408678 A | 11/2017 |
| CN | 109279659 A | 1/2019 |
| JP | 2015118945 A | 6/2015 |
| JP | 2016152139 A | 8/2016 |
| JP | 2017084788 A | 5/2017 |
| JP | 2018-014322 A | 1/2018 |
| JP | 2018118891 A | 8/2018 |
| KR | 20140089851 A | 7/2014 |
| KR | 20160093817 A | 8/2016 |
| KR | 20170038485 A | 4/2017 |
| KR | 101882878 B1 | 7/2018 |
| KR | 20180105144 A | 9/2018 |
| WO | 2018043190 A1 | 3/2018 |
| WO | 2018117506 A1 | 6/2018 |

OTHER PUBLICATIONS

Search Report dated Apr. 29, 2024 from the Office Action for Chinese Application No. 202080003990.8 Issued May 1, 2024, pp. 1-2.
International Search Report for PCT/KR2020/001526 mailed May 12, 2020; 2 pages.
Extended European Search Report including Written Opinion for Application No. 20747647.4 dated Oct. 5, 2021, pp. 1-7.
Speakman, Scott A. "Estimating Crystallite Size Using XRD." MIT Center for Materials Science and Engineering 2 (2014), pp. 1-105 (http://prism.mit.edu/XRAY/oldsite/CrystalSizeAnalysis.pdf).

* cited by examiner

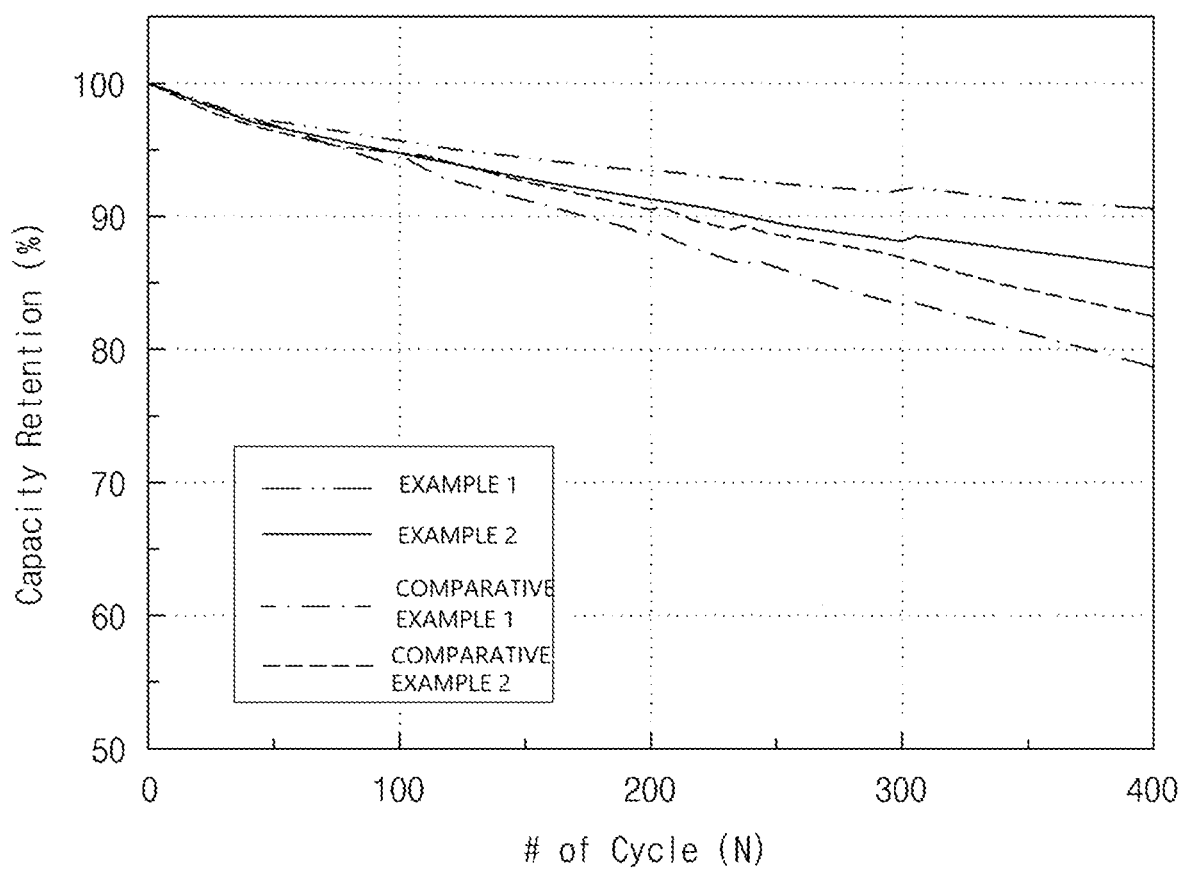

POSITIVE ELECTRODE ACTIVE MATERIAL FOR SECONDARY BATTERY AND LITHIUM SECONDARY BATTERY INCLUDING THE SAME

CROSS-REFERENCE TO RELATED APPLICATIONS

This application is a continuation of U.S. application Ser. No. 17/263,383, filed on Jan. 26, 2021, which is a national phase entry under 35 U.S.C. § 371 of International Application No. PCT/KR2020/001526, filed on Jan. 31, 2020, which claims priority from Korean Patent Application No. 10-2019-0013809, filed on Feb. 1, 2019, the disclosure of which is incorporated by reference herein.

TECHNICAL FIELD

The present invention relates to a positive electrode active material for a secondary battery and a lithium secondary battery including the same.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Also, as a method to improve low thermal stability while maintaining excellent reversible capacity of the $LiNiO_2$, a lithium composite metal oxide (hereinafter, simply referred to as 'NCM-based lithium transition metal oxide' or 'NCA-based lithium transition metal oxide') in which a portion of nickel (Ni) is substituted with cobalt (Co) or manganese (Mn)/aluminum (Al), has been developed. However, since capacity characteristics of conventionally developed NCM-based/NCA-based lithium transition metal oxides are insufficient, the NCM-based/NCA-based lithium transition metal oxides have been limited in application.

Thus, in order to improve the capacity characteristics, studies have been made to increase a nickel (Ni) content in the NCM-based/NCA-based lithium transition metal oxides. However, with respect to a high-Ni positive electrode active material with a high nickel content, it may achieve higher capacity than a layered structure positive electrode active material having a different composition, but its surface is unstable, structural degradation occurs during charge and discharge, and a large change in lattice constant, that is, a lot of volume changes in a unit cell occurs. Since this change in the volume causes cracks in the positive electrode active material and these cracks become severe during charge and discharge, the cracks act as voids that may not be reached by the electrolyte solution or reduce conductivity. To prevent this, performance of the high-Ni positive electrode active material has been improved by coating or doping. However, the coating/doping may incur an additional cost, and it may be difficult to uniformly coat/dope the surface or lattice of the positive electrode active material.

DISCLOSURE OF THE INVENTION

Technical Problem

An aspect of the present invention provides a positive electrode active material which may minimize cracks in the positive electrode active material which occur during charge and discharge, may increase capacity retention according to the progression of cycles, and may suppress a resistance increase rate by optimizing a crystallite size and reducing strain in the positive electrode active material of a nickel-based lithium composite transition metal oxide.

Technical Solution

According to an aspect of the present invention, there is provided a positive electrode active material for a secondary battery which includes a nickel-based lithium composite transition metal oxide including nickel (Ni), wherein the lithium composite transition metal oxide satisfies the following Equation 1 and Equation 2.

$$80 \text{ nm} \leq \text{crystallite size}_{FWHM} \leq 150 \text{ nm} \quad \text{[Equation 1]}$$

$$\Delta \text{ size}(|\text{crystallite size}_{IB}-\text{crystallite size}_{FWHM}|) \leq 20 \quad \text{[Equation 2]}$$

In Equation 1 and Equation 2, crystallite $size_{FWHM}$ is a crystallite size obtained by calculating from X-ray diffraction (XRD) data using a full width at half maximum (FWHM) method, and crystallite $size_{IB}$ is a crystallite size obtained by calculating from XRD data using an integral breadth (IB) method.

According to another aspect of the present invention, there is provided a positive electrode and a lithium secondary battery which include the positive electrode active material.

Advantageous Effects

According to the present invention, in a positive electrode active material of a nickel-based lithium composite transition metal oxide, cracks in the positive electrode active material, which occur during charge and discharge, may be minimized, capacity retention according to the progression of cycles may be increased, and a resistance increase rate may be suppressed.

BRIEF DESCRIPTION OF THE DRAWINGS

The FIGURE is a graph evaluating life characteristics of secondary batteries in which positive electrode active materials of Examples and Comparative Examples are used.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode Active Material>

A positive electrode active material for a secondary battery of the present invention is a nickel-based lithium composite transition metal oxide including nickel (Ni), wherein the lithium composite transition metal oxide satisfies the following Equation 1 and Equation 2.

80 nm≤crystallite size$_{FWHM}$≤150 nm   [Equation 1]

Δ size(|crystallite size$_{IB}$−crystallite size$_{FWHM}$|)≤20   [Equation 2]

In Equation 1 and Equation 2, crystallite size$_{FWHM}$ is a crystallite size obtained by calculating from X-ray diffraction (XRD) data using a full width at half maximum (FWHM) method, and crystallite size$_{IB}$ is a crystallite size obtained by calculating from XRD data using an integral breadth (IB) method.

The positive electrode active material of the present invention is a nickel-based lithium composite transition metal oxide including nickel (Ni). Preferably, the lithium composite transition metal oxide includes nickel (Ni), and may further include at least one of cobalt (Co), manganese (Mn), and aluminum (Al). Also, the lithium composite transition metal oxide may be a high-Ni lithium composite transition metal oxide in which nickel (Ni) among metals excluding lithium is included in an amount of 60 mol % or more, and more preferably, nickel (Ni) may be included in an amount of 70 mol % or more, for example, 80 mol % or more. As described above, since the nickel (Ni) among the metals excluding lithium is included in an amount of 60 mol % or more, high capacity may be ensured.

Furthermore, the lithium composite transition metal oxide according to an embodiment of the present invention may be represented by Formula 1 below.

Li$_a$Ni$_{1-(x+y+z)}$Co$_x$M'$_y$M''$_z$O$_{2+\delta}$   [Formula 1]

In Equation 1, M' is at least one of Mn and Al, M'' is at least one of barium (Ba), calcium (Ca), zirconium (Zr), titanium (Ti), magnesium (Mg), tantalum (Ta), niobium (Nb), and molybdenum (Mo), 1.0≤a≤1.5, x<y, 0≤z≤0.1, 0.1≤x+y+z≤0.4, and 0≤δ≤1.0.

In the lithium composite transition metal oxide of Formula 1, lithium (Li) may be included in an amount corresponding to a, that is, 1.0≤a≤1.5. When a is less than 1.0, capacity may be reduced, and, when a is greater than 1.5, milling is difficult due to an increase in strength of the sintered positive electrode active material and there may be an increase in amount of gas generated due to an increase in Li by-product. The Li may more preferably be included in an amount satisfying 1.0≤a≤1.1, in consideration of balance between a capacity characteristics improvement effect of the positive electrode active material and sinterability during the preparation of the active material due to the control of the amount of the Li.

In the lithium composite transition metal oxide of Formula 1, Ni may be included in an amount corresponding to 1−(x+y+z), for example, 0.6≤1−(x+y+z)≤0.9. If the amount of the Ni in the lithium composite transition metal oxide of Formula 1 is 0.6 or more, since the amount of Ni, which is sufficient to contribute to charge and discharge, is secured, higher capacity may be achieved. The Ni may more preferably be included in an amount satisfying 0.6≤1−(x+y+z)≤0.8.

In the lithium composite transition metal oxide of Formula 1, Co may be included in an amount corresponding to x, and M' may be included in an amount corresponding to y. In this case, Co and M' may be included in amounts to satisfy x<y, and, since structural stability of a layered structure is increased when y is greater than x, a volume change of a lattice, which occurs during charge/discharge, is reduced, and thus, it may be effective in suppressing degradation of the structure and occurrence of cracks.

In the lithium composite transition metal oxide of Formula 1, M'' may be a doping element included in a crystal structure of the lithium composite transition metal oxide, and M'' may be included in an amount corresponding to z, that is, 0≤z≤0.1.

As described above, with respect to the positive electrode active material of the high-Ni lithium composite transition metal oxide in which nickel (Ni) among metals excluding lithium is included in an amount of 60 mol % or more, it may achieve high capacity, but its surface is unstable, structural degradation occurs during charge and discharge, and a large change in lattice constant, that is, a lot of volume changes in a unit cell occurs. Since this change in the volume causes cracks in the positive electrode active material and these cracks become severe during charge and discharge, the cracks may act as voids that may not be reached by the electrolyte or reduce conductivity.

Thus, in the present invention, the occurrence of the cracks in the positive electrode active material of the high-Ni lithium composite transition metal oxide with 60 mol % or more of nickel (Ni) during charge and discharge may be minimized, capacity retention according to the progression of cycles of the secondary battery may be increased, and a resistance increase rate may be suppressed by optimizing a crystallite size and reducing strain so as to satisfy Equation 1 and Equation 2.

A particle of the lithium composite transition metal oxide of the present invention is composed of a secondary particle in which primary particles are aggregated. In the present invention, the expression 'primary particle' denotes a primary structure of a single particle, and the expression 'secondary particle' denotes an aggregate in which primary particles are aggregated by physical or chemical bonding between the primary particles without an intentional aggregation or assembly process of the primary particles constituting the secondary particle, that is, a secondary structure.

In the present invention, the expression 'particle' denotes a granule with a size of microns, and, when the particle is magnified and observed, the particle may be identified as 'grain' which has a crystal form with a size of a few tens of nanometers. When the grain is further magnified, it is possible to identify a separated region having a form in which atoms form a lattice structure in a predetermined direction, wherein the region is referred to as a 'crystallite', and a size of the particle observed by X-ray diffraction (XRD) is defined as a size of the crystallite. With respect to a method of measuring the crystallite size, the crystallite size may be determined by using XRD data.

The positive electrode active material of the present invention satisfies the following Equation 1.

80 nm≤crystallite size$_{FWHM}$≤150 nm   [Equation 1]

In Equation 1, crystallite size$_{FWHM}$ is a crystallite size obtained by calculating from XRD data using a full width at half maximum (FWHM) method. The positive electrode active material according to an embodiment of the present invention may preferably has a crystallite $size_{FWHM}$ of 90 nm to 150 nm, more preferably 100 nm to 145 nm, and most preferably 130 nm to 132 nm.

Also, the positive electrode active material of the present invention simultaneously satisfies the following Equation 2.

$$\Delta \text{ size}(|\text{crystallite size}_{IB}-\text{crystallite size}_{FWHM}|) \leq 20 \quad \text{[Equation 2]}$$

In Equation 2, crystallite $size_{FWHM}$ is a crystallite size obtained by calculating from XRD data using a full width at half maximum (FWHM) method, and crystallite $size_{IB}$ is a crystallite size obtained by calculating from XRD data using an integral breadth (IB) method. The crystallite $size_{FWHM}$ is calculated without considering strain, and the crystallite $size_{IB}$ is calculated in consideration of strain, wherein a difference between the crystallite $size_{FWHM}$ and the crystallite $size_{IB}$ may be referred to as a degree of strain. In general, when calculating a crystallite size, it is calculated by assuming that a peak shape is a symmetrical bell shape, but an actual peak shape is not symmetrical and peak broadening occurs due to an effect of strain. The FWHM method ignores the peak broadening and calculates using a Lorentzian method, and, since the IB method is a calculation method of correcting an area through a Double-Voigt method using a combination of two methods of Lorenzian and Gaussian, it is a calculation method in which the peak broadening by the strain is considered. Thus, the difference between the crystallite $size_{FWHM}$ and the crystallite $size_{IB}$ may be referred to as the degree of strain.

The positive electrode active material according to the embodiment of the present invention may have a $\Delta$ size (|crystallite $size_{IB}$–crystallite $size_{FWHM}$|) of 18 or less, that is, 0 to 18, preferably 17 or less, that is, 0 to 17, and more preferably 16 or less, that is, 0 to 16.

Since the positive electrode active material of the present invention satisfies Equation 1 and Equation 2 at the same time, that is, the positive electrode active material of the present invention satisfies a crystallite $size_{FWHM}$ of 80 nm to 150 nm and a $\Delta$ size(|crystallite $size_{IB}$–crystallite $size_{FWHM}$|) of 20 or less, the cracks in the positive electrode active material, which occur during charge and discharge, may be minimized, the capacity retention according to the progression of cycles may be increased, and the resistance increase rate may be suppressed.

The positive electrode active material satisfying Equation 1 and Equation 2 of the present invention may be achieved by adjusting sintering temperature and sintering time. When a positive electrode active material precursor and a lithium source are mixed and then sintered to prepare a lithium composite transition metal oxide, the sintering may be performed at a sintering temperature relatively lower than a conventional sintering temperature for a longer period of time to increase a degree of completeness of the sintering and reduce strain that may occur in the crystallite.

Specifically, after a positive electrode active material precursor including nickel (Ni), for example, a high-Ni positive electrode active material precursor in which nickel (Ni) among total metals is included in an amount of 60 mol % or more, and a lithium source, for example, LiOH, are mixed and primarily sintered at about 450° C. to about 500° C., near a melting point of the LiOH, secondary sintering is performed at about 730° C. to about 780° C. which is a temperature lower than a conventional sintering temperature of 790° C. to 830° C., and the sintering may be performed for a long period of time, that is, a total sintering time of about 30 hours or more, to prepare a lithium composite transition metal oxide. This allows Li ions to sufficiently diffuse into the structure, and thus, strain, which may be present in the positive electrode active material, may be minimized.

However, in addition, there is no particular limitation as long as it is a preparation method which allows the crystallite size and the strain in the crystallite to satisfy Equation 1 and Equation 2 by adjusting sintering conditions.

<Positive Electrode and Secondary Battery>

According to another embodiment of the present invention, provided are a positive electrode for a secondary battery and a lithium secondary battery which include the positive electrode active material prepared as described above.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a nonwoven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a nonwoven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

A $Ni_{0.69}Co_{0.13}Mn_{0.18}(OH)_2$ positive electrode active material precursor and a lithium raw material (LiOH) were added to a Henschel mixer (700 L) such that a final molar ratio of Li/M(Ni,Co,Mn) was 1.05, and were mixed at a center speed of 300 rpm for 20 minutes. The mixed powder was put in an alumina crucible with a size of 330 mm×330 mm, held at 500° C. for 10 hours in an oxygen ($O_2$) atmosphere, and then sintered at 730° C. for 30 hours to prepare a positive electrode active material.

Example 2

A positive electrode active material was prepared in the same manner as in Example 1 except that the mixed powder was held at 500° C. for 10 hours and then sintered at 750° C. for 20 hours.

Comparative Example 1

A positive electrode active material was prepared in the same manner as in Example 1 except that the sintering was performed at 830° C. for 20 hours.

Comparative Example 2

A positive electrode active material was prepared in the same manner as in Example 1 except that the sintering was performed at 810° C. for 31 hours.

Experimental Example 1: Crystallite Size and Strain Measurements

Crystallite sizes of the positive electrode active materials prepared in Examples 1 and 2 and Comparative Examples 1 and 2 were measured. Crystallite $size_{FWHM}$ was calculated from XRD data using a full width at half maximum (FWHM) method, and crystallite $size_{IB}$ was calculated from XRD data using an integral breadth (IB) method.

TABLE 1

| | Crystallite $size_{FWHM}$ (nm) | Δ size (\|crystallite $size_{IB}$ − crystallite $size_{FWHM}$\|) |
|---|---|---|
| Example 1 | 130 | 8 |
| Example 2 | 132 | 17 |
| Comparative Example 1 | 180 | 34 |
| Comparative Example 2 | 175 | 25 |

Referring to Table 1, with respect to Examples 1 and 2, the crystallite $size_{FWHM}$ satisfied 80 nm to 150 nm, and the Δ size(\|crystallite $size_{IB}$−crystallite $size_{FWHM}$\|), that is, strain satisfied 20 or less, and Comparative Examples 1 and 2 did not satisfy Equation 1 and/or Equation 2 and were deviated therefrom.

Experimental Example 2: Life Characteristics Evaluation

Each of the positive electrode active materials prepared in Examples 1 and 2 and Comparative Examples 1 and 2, a carbon black conductive agent, and a PVdF binder were mixed in an N-methylpyrrolidone solvent at a weight ratio of 96:2:2 to prepare a positive electrode material mixture, and one surface of an aluminum current collector was coated with the positive electrode material mixture, dried at 100° C., and then rolled to prepare a positive electrode.

Lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/ethylmethyl carbonate/diethyl carbonate (mixing volume ratio of EC/EMC/DEC=3/4/3).

Each lithium secondary battery half cell prepared as described above was charged at 0.5 C to a voltage of 4.3 V in a constant current/constant voltage (CCCV) mode at 45° C., and discharged at a constant current of 0.5 C to a voltage of 2.5 V to measure capacity retention and resistance increase rate when 400 cycles of charge and discharge were performed. The results thereof are presented in Table 2 and the FIGURE.

TABLE 2

| | Capacity retention (%) (@400 cycles) | Resistance increase rate (%) (@400 cycles) |
|---|---|---|
| Example 1 | 90.4 | 124 |
| Example 2 | 86.2 | 135 |
| Comparative Example 1 | 78.8 | 161 |
| Comparative Example 2 | 82.5 | 146 |

Referring to Table 2, with respect to Examples 1 and 2, in which the crystallite size$_{FWHM}$ satisfied 80 nm to 150 nm and the Δ size(|crystallite size$_{IB}$–crystallite size$_{FWHM}$|), that is, the strain satisfied 20 or less, capacity retentions were improved and resistance increase rates were reduced in comparison to those of Comparative Examples 1 and 2.

The invention claimed is:

1. A positive electrode active material for a secondary battery, comprising:

a lithium composite transition metal oxide comprising nickel (Ni), and at least one of cobalt (Co), manganese (Mn), or aluminum (Al), wherein the nickel (Ni) among metals excluding lithium of the lithium composite transition metal oxide is included in an amount of 60 mol % or more, and wherein the lithium composite transition metal oxide satisfies Equation 2:

Δ size(|crystallite size$_{IB}$–crystallite size$_{FWHM}$|)≤20   [Equation 2]

wherein, crystallite size$_{FWHM}$ is a crystallite size obtained by calculating from X-ray diffraction (XRD) data using a full width at half maximum (FWHM) method, and crystallite size$_{IB}$ is a crystallite size obtained by calculating from XRD data using an integral breadth (IB) method.

2. The positive electrode active material for a secondary battery of claim 1, wherein a particle of the lithium composite transition metal oxide is a secondary particle in which primary particles are aggregated.

3. The positive electrode active material for a secondary battery of claim 1, wherein the lithium composite transition metal oxide is represented by Formula 1:

$$Li_aNi_{1-(x+y+z)}Co_xM'_yM''_zO_{2+\delta}$$   [Formula 1]

wherein, in Formula 1, M' is at least one selected from the group consisting of Mn and Al, M" is at least one selected from the group consisting of barium (Ba), calcium (Ca), zirconium (Zr), titanium (Ti), magnesium (Mg), tantalum (Ta), niobium (Nb), and molybdenum (Mo), 1.0≤a≤1.5, x<y, 0≤z≤0.1, 0.1≤x+y+z≤0.4, and 0≤δ≤1.0.

4. The positive electrode active material for a secondary battery of claim 1, wherein the Δ size(|crystallite size$_{IB}$–crystallite size$_{FWHM}$|) in Equation 2 is 17 or less.

5. A positive electrode for a secondary battery, the positive electrode comprising the positive electrode active material of claim 1.

6. A lithium secondary battery comprising the positive electrode of claim 5.

7. The positive electrode active material for a secondary battery of claim 1, wherein the lithium composite transition metal oxide satisfies Equation 1:

80 nm≤crystallite size$_{FWHM}$≤150 nm   [Equation 1]

wherein, crystallite size$_{FWHM}$ is a crystallite size obtained by calculating from X-ray diffraction (XRD) data using a full width at half maximum (FWHM) method, and crystallite size$_{IB}$ is a crystallite size obtained by calculating from XRD data using an integral breadth (IB) method.

8. The positive electrode active material for a secondary battery of claim 7, wherein the crystallite size$_{FWHM}$ in Equation 1 is in a range of 130 nm to 132 nm.

* * * * *